United States Patent [19]

Stockmar

[11] Patent Number: 4,923,041
[45] Date of Patent: May 8, 1990

[54] BLADE FOR LIQUID FRICTION COUPLINGS

[75] Inventor: Jurgen Stockmar, Graz, Austria

[73] Assignee: Steyr-Daimler-Puch AG, Vienna, Austria

[21] Appl. No.: 201,582

[22] Filed: Jun. 2, 1988

Related U.S. Application Data

[63] Continuation-in-part of Ser. No. 905,887, Sep. 10, 1986, abandoned.

[30] Foreign Application Priority Data

Sep. 11, 1985 [AT] Austria ................................ 2656/85

[51] Int. Cl.⁵ ............................................. F16D 35/00
[52] U.S. Cl. ................................. 192/58 B; 192/58 R
[58] Field of Search ................. 192/58 R, 58 A, 58 B, 192/58 C, 70.14; 188/322.5; 30/347; 464/24

[56] References Cited

U.S. PATENT DOCUMENTS

| | | | |
|---|---|---|---|
| 958,809 | 5/1910 | Hawkins | 30/347 X |
| 1,120,270 | 12/1914 | Brussolo | 30/347 X |
| 2,743,792 | 5/1956 | Ransom | 192/58 B X |
| 3,002,595 | 10/1961 | Weir | 192/58 B |
| 4,040,271 | 8/1977 | Rolt et al. | 192/58 B |
| 4,128,153 | 12/1978 | Main | 192/58 B |
| 4,432,444 | 2/1984 | Hauser | 192/58 B |

FOREIGN PATENT DOCUMENTS

| | | |
|---|---|---|
| 1192887 | 1/1966 | Fed. Rep. of Germany . |
| 2135791 | 11/1976 | Fed. Rep. of Germany . |
| 209262 | 1/1924 | United Kingdom . |
| 598606 | 2/1948 | United Kingdom . |
| 712476 | 7/1954 | United Kingdom . |
| 824951 | 12/1959 | United Kingdom . |
| 840611 | 7/1960 | United Kingdom . |
| 906629 | 9/1962 | United Kingdom . |

*Primary Examiner*—Leslie A. Braun
*Assistant Examiner*—Richard M. Lorence
*Attorney, Agent, or Firm*—Marmorek, Guttman & Rubenstein

[57] ABSTRACT

A blade for liquid friction couplings consists of a disc (1), which is formed in its effective end faces with a plurality of substantially radially extending interruptions (4, 4'). To increase the torque limit without a loss of strength and without an increase of the blade spacing, the interruptions consist of grooves (4, 4'). The grooves (4) on one end face are staggered from the grooves (4') on the other end face.

10 Claims, 2 Drawing Sheets

BLADE FOR LIQUID FRICTION COUPLINGS

This is a continuation-in-part application of Ser. No. 905,887 filed on Sept. 10, 1986, now abandoned.

This invention relates to a blade for liquid friction couplings, which blade comprises a disc having effective end faces which are formed with a plurality of essentially radially extending interruptions.

Blades of that kind are already known from German Patent Specification No. 2,135,791. In that known blade the interruptions in the effective or end faces consist of radial slots, which do not serve only to facilitate the filling of the housing of the coupling with a viscous liquid but have mainly the function to increase the torque limit of the coupling. But the radial slots which interrupt the end faces greatly decrease the stiffness of the blades and the tongues which remain between the slots can easily be deformed. such deformations may result in a contact with the blades of the other set, which may rotate at a different speed, so that the wear of the blade will be increased and the stability of the entire multiblade unit will be reduced.

From German Patent No. 1,192,887 it is known to provide blades consisting of unslotted, solid-surfaced discs which have axially protruding corrugations. But in comparison with blades having slots defined by sharp edges, the obviously gentle transition from one corrugation to the next will reduce the torque limit. Besides, the undeformed serrated annular portion which is provided in the blade and serves to non-rotatably connect the blade to the associated coupling section is relatively thin so that the strength of the toothed joint connecting the blade to the driving or driven coupling section is adversely affected. Finally, the amplitude of the corrugations in the axial direction of the coupling are relatively large so that the axial dimension of a coupling comprising a given number of blades will appreciably be increased.

For this reason it is an object of the invention to eliminate said disadvantages and to provide a blade which is of the kind described first hereinbefore and which permits the torque limit to be increased in spite of a loss of strength and without an increase of the blade spacing.

This object is accomplished in accordance with the invention in that the interruptions are formed by grooves and the grooves provided on the two end faces are staggered from each other.

Contrary to the radial slots of the known blade, the grooves result only in a negligible decrease of the stiffness and strength of the blade. For this reason the grooves may be provided in a relatively large number so that the torque limit can be considerably increased over that of a coupling having smooth-surfaced blades. Because the grooves obviously have sharp longitudinal edges, the transmission of torque will be improved also in comparison with corrugated blades. Because there is no risk that free tongues defined by slots may be deflected out of the plane of the blade, the distances from the adjacent blades of the other set may be decreased so that the torque limit will inherently be increased. Besides, a larger number of blades can be accommodate in a coupling having a given total length so that the torque limit can be increased further.

An illustrative embodiment of the invention is shown in the drawings, in which

Figure 1:
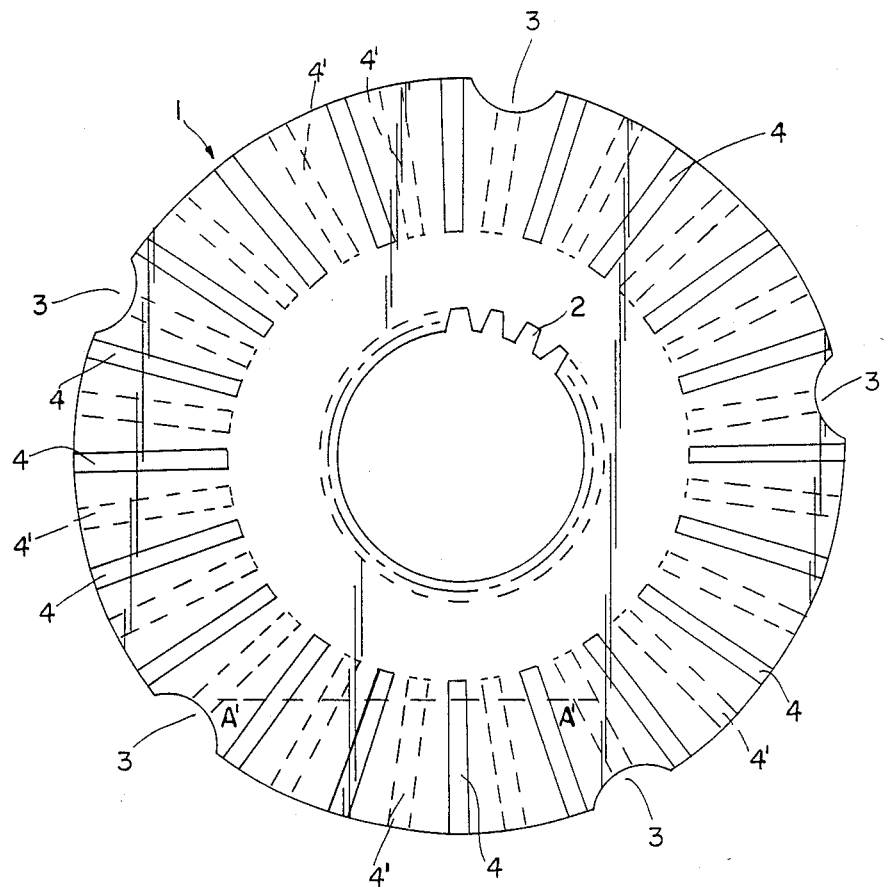
FIG. 1 is an elevation showing a blade for a liquid friction coupling.
Figure 2:
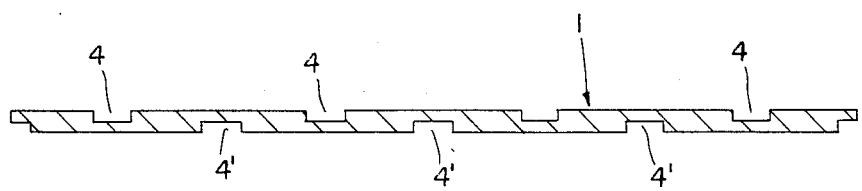
FIG. 2 is an enlarged sectional view taken along the line A—A'.

Referring to FIGS. 1 and 2, a so-called inner blade 1, which is non-rotatably connected to the shaft section of the liquid friction coupling, is provided with a serrated portion 2 for making said connection and is provided at its periphery with apertures 3, which facilitate the filling of the housing of the coupling. The blade 1 is formed on its two effective end faces with a plurality of radially extending interruptions, which consists of grooves 4, 4'. The grooves 4 of one end face are staggered from the grooves 4' on the other end face. The blade 1 is a substantially flat disc.

Figure 3:
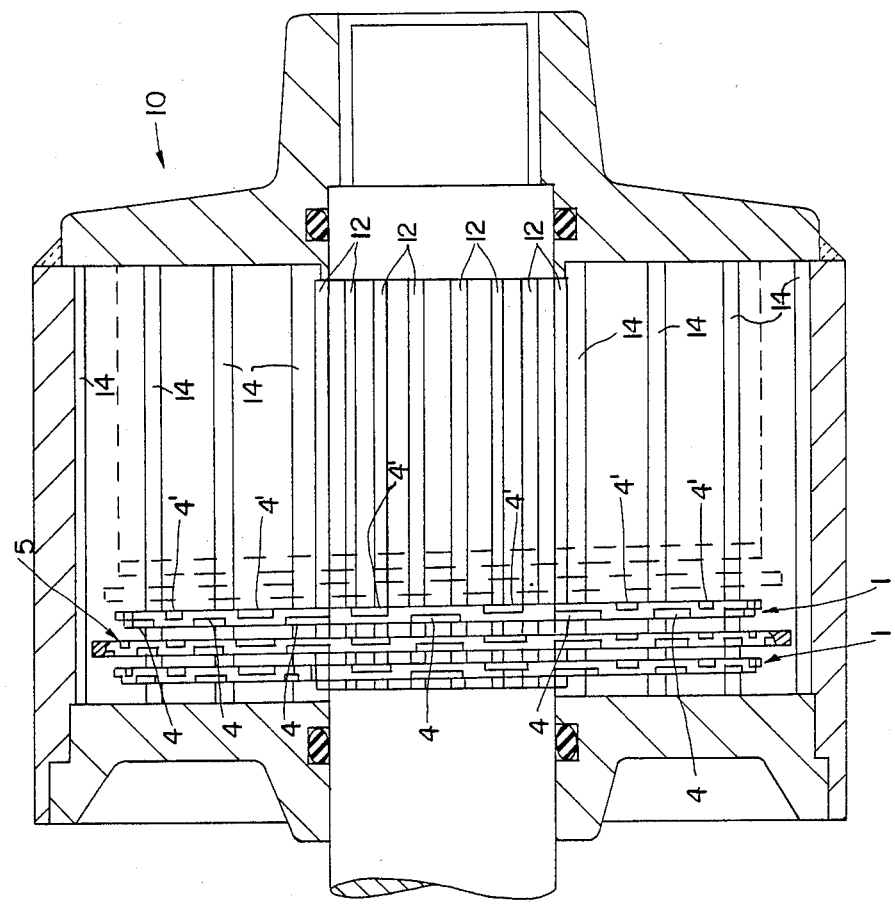
FIG. 3 is a cross-sectional view of a liquid friction coupling having blades in accordance with the present invention.

A liquid friction coupling 10 in accordance with the present invention is illustrated in FIG. 3. The liquid friction coupling 10 has multiple inner blades 1 non-rotatably connected to a shaft of the liquid friction coupling by means of longitudinal ribs 12. Multiple outer blades 5 similar to inner blades 1 are connected to the liquid friction coupling housing by means of longitudinal ribs 14. A viscous fluid fills the housing. Inner blades 1 and outer blades 5 both are provided with grooves 4, 4' on their respective faces, the grooves 4 of one face being staggered from the grooves for 4' on the other face. Corresponding faces of inner blades 1 and outer blades 5 are in confronting relationship with each other with the viscous fluid between the confronting faces.

While the invention has been described by reference to specific examples, this was for purposes of illustration only and should not be construed to limit the spirit or scope of the invention.

I claim:

1. A torque transmitting liquid friction coupling blade, comprising a flat disc having front and rear faces, a plurality of open straight groove means disposed on said front face for increasing the torque transmitted by a viscous fluid to a blade adjacent said front face, and a plurality of open straight groove means disposed on said rear face for increasing the torque transmitted by a viscous fluid to a blade adjacent said rear face, all of said groove means on said front and rear faces extending along axes which emanate from a single central axis of rotation of said torque transmitting blade, said groove means on said front face being offset from said groove means on said rear face so that said groove means on said front face are positioned in the spaces between said groove means on said rear face, and said groove means on said rear face are positioned in the spaces between said groove means of said front face.

2. The blade of claim 1 wherein said disc includes peripheral apertures.

3. The blade of claim 1 wherein said disc is annular and includes a serrated central portion.

4. The blade of claim 1 wherein said disc is substantially flat.

5. In combination, a housing containing a viscous fluid, and first and second torque transmitting liquid friction coupling blades disposed within said housing, said blades being in liquid communication with each other, said blades being in confronting relationship with each other to transmit torque to each other by means of viscous shear forces, each of said blades comprising a flat disc having a front and rear face, a plurality of open radially extending straight groove means disposed on said front face for increasing the torque transmitted by said viscous fluid to a blade adjacent said front face, and a plurality of open radially extending groove means disposed on said rear face for increasing the torque transmitted by a viscous fluid to a blade adjacent said rear face, all of said groove means on each of said blades extending along axes which emanate from a single central axis of rotation associated with its corresponding blade, said groove means on said front face of said first blade being offset from said groove means on said rear face of said first blade, and said groove means on said front face of said second blade being offset from said groove means on said rear face of said second blade.

6. The combination of claim 5 wherein said first blade includes a peripheral aperture.

7. The combination of claim 5 wherein said first blade is annular and includes a serrated central portion.

8. A liquid friction coupling comprising
a housing,
a first set of blades,
a second set of blades interleaved with said first set of blades, and
a viscous fluid in said housing,
said first and second sets of blades transmitting torque to each other by means of viscous shear forces,
said blades being in confronting relationship with each other,
said blades comprising flat discs having front and rear faces, a plurality of open radially extending straight groove means disposed on said front faces for increasing the torque transmitted by said viscous fluid to blades adjacent said front faces, and a plurality of open radially extending straight groove means disposed on said rear faces for increasing the torque transmitted by said viscous fluid to blades adjacent said rear faces, all of said groove means on each of said blades extending along axes which emanate from a single central axis of rotation associated with its corresponding blade, said groove means on said front face of each blade being offset from said groove means on said rear face of said blade so that said groove means on said front face of said blade are positioned in the spaces between said groove means on said rear face of said blade.

9. The liquid friction coupling of claim 8 wherein said discs of said first set of blades include a serrated central portion.

10. The liquid friction coupling of claim 8 wherein said discs of said first set of blades are annular and include a peripheral aperture.

* * * * *